United States Patent [19]

Breault

[11] Patent Number: 4,667,622
[45] Date of Patent: May 26, 1987

[54] PET LITTER BOX SYSTEM
[76] Inventor: David S. Breault, 445 Dryden St., Glendale, Calif. 91202
[21] Appl. No.: 697,856
[22] Filed: Feb. 4, 1985
[51] Int. Cl.⁴ ............................................. A01K 23/00
[52] U.S. Cl. ........................................................ 119/1
[58] Field of Search ............................................ 119/1

[56]  References Cited
U.S. PATENT DOCUMENTS

| 3,246,630 | 4/1966 | Dearing et al. | 119/1 |
| 3,618,568 | 11/1971 | Breeden | 119/1 X |
| 4,299,190 | 11/1981 | Rhodes | 119/1 |
| 4,522,150 | 6/1985 | Gershman | 119/1 |

Primary Examiner—Hugh R. Chamblee
Attorney, Agent, or Firm—John E. Wagner

[57] ABSTRACT

A pet litter box is disclosed which stores pet litter and automatically dispenses a measured amount of litter to a pet sanitary floor and collects used litter into a storage area within the litter box. The simultaneous removal of used litter from the pet sanitary floor and resupply of fresh litter from the supply is accomplished after filling an upper bin by tipping the box on one end which fills a temporary holding area and at the same time dumps the used litter into second holding area. Return of the box to its normal upright position causes the fresh litter to descend through an inclined chute to the pet sanitary floor and allows the used litter to fall from the second holding area to the collection storage area. The litter box includes a system of inclined baffles which define a generally triangular fresh litter storage volume, two parallel chutes and a generally triangular used litter collection bin. A removable bag or litter collection box fits in the collection bin. A removable cover allows access to both bins and the pet sanitary floor. A pet entrance to the pet sanitary floor is located in a side wall of the litter box.

22 Claims, 17 Drawing Figures

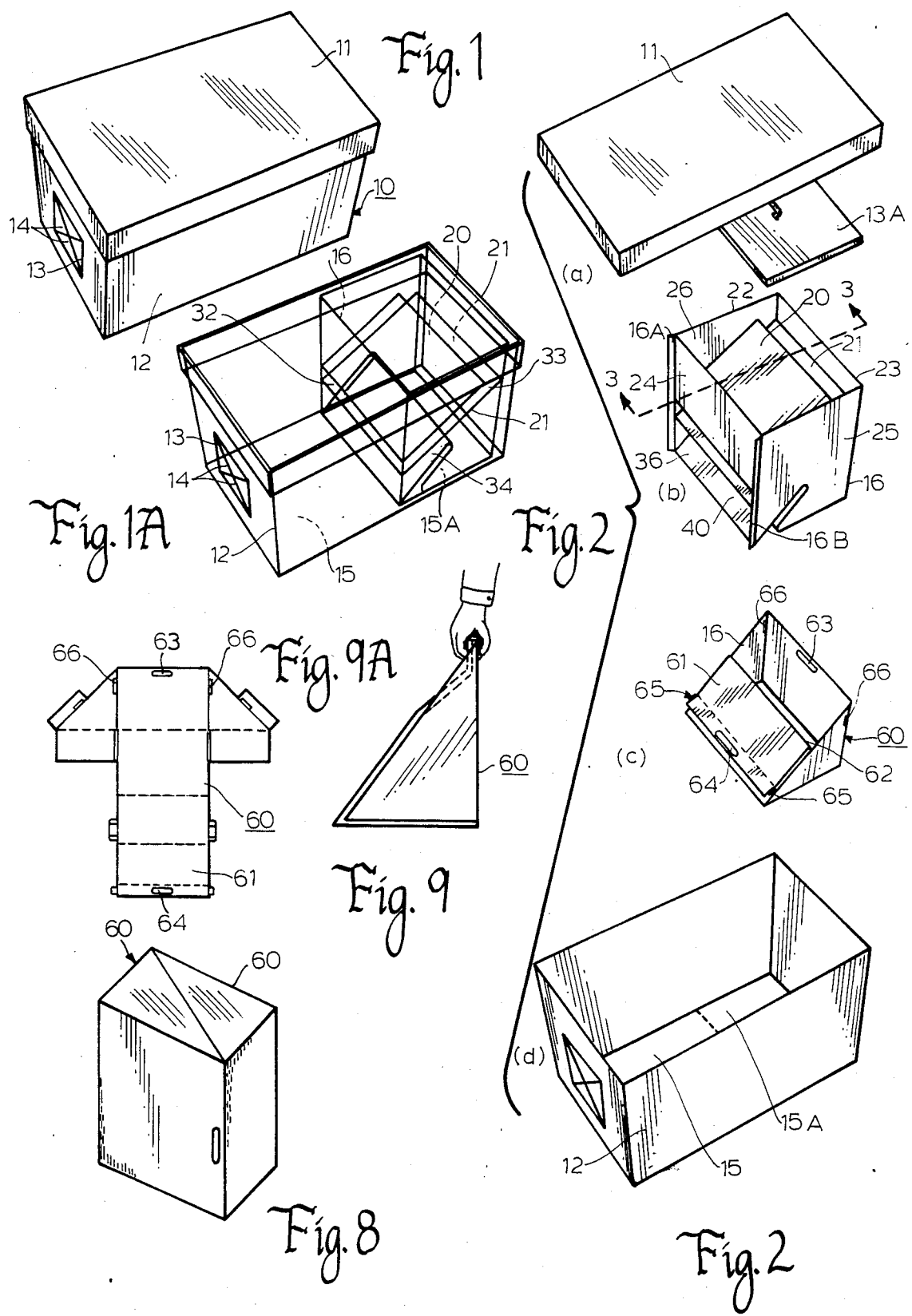

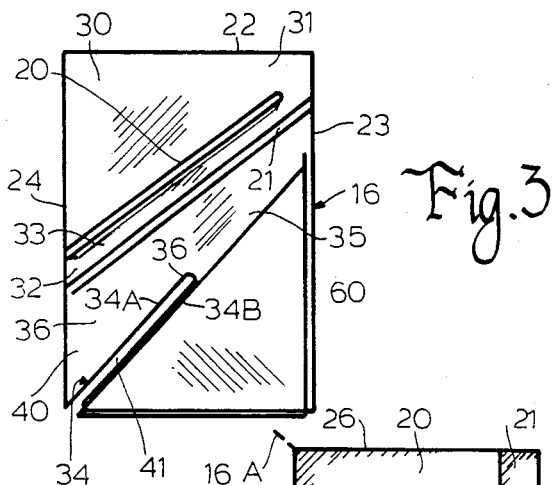
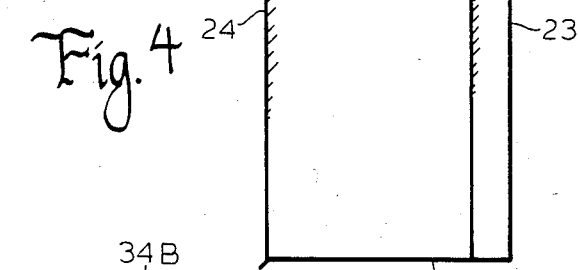
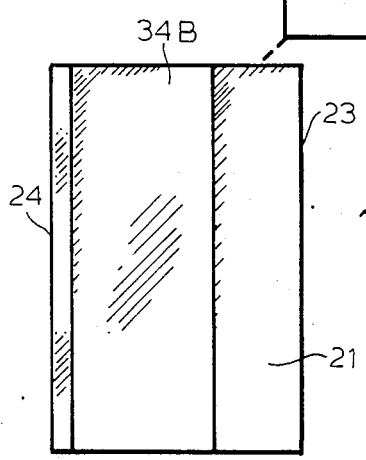
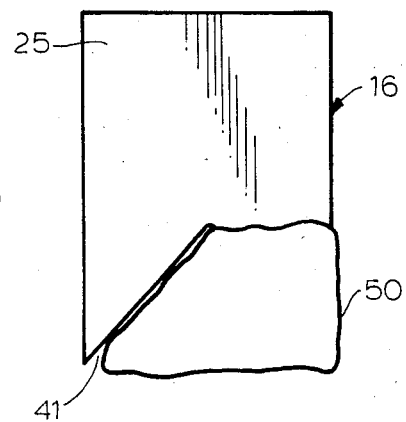
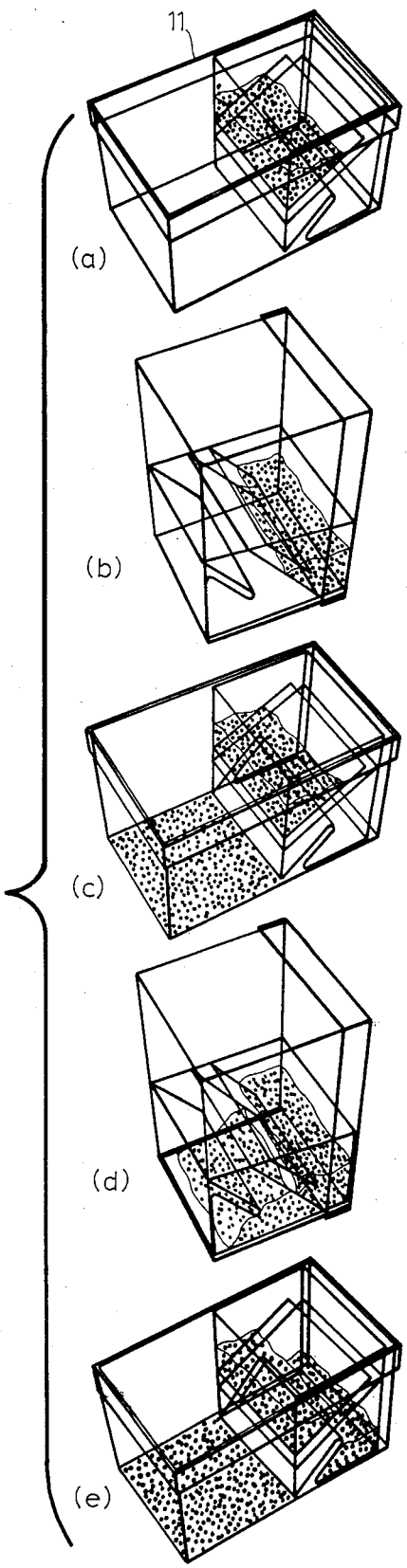

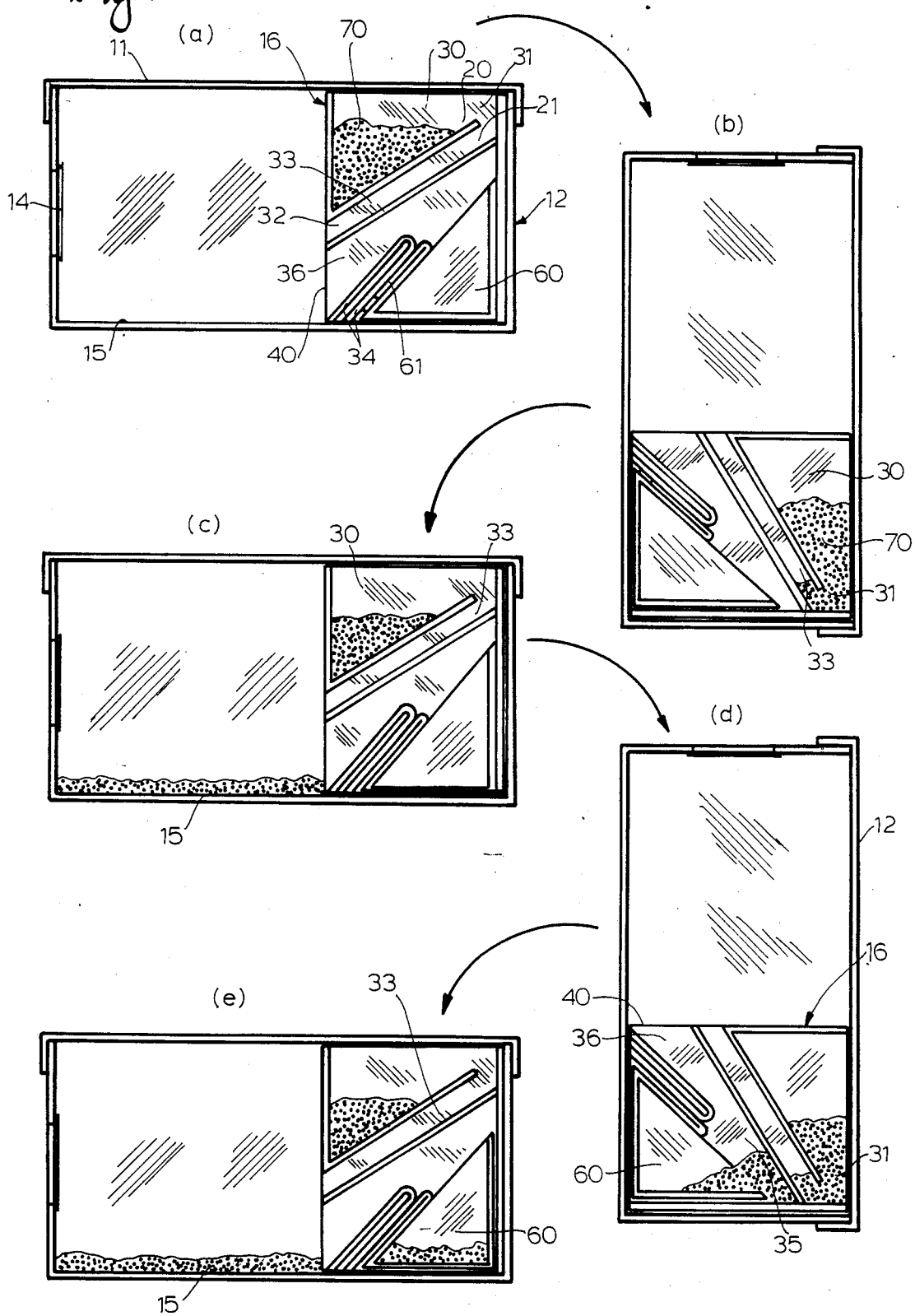

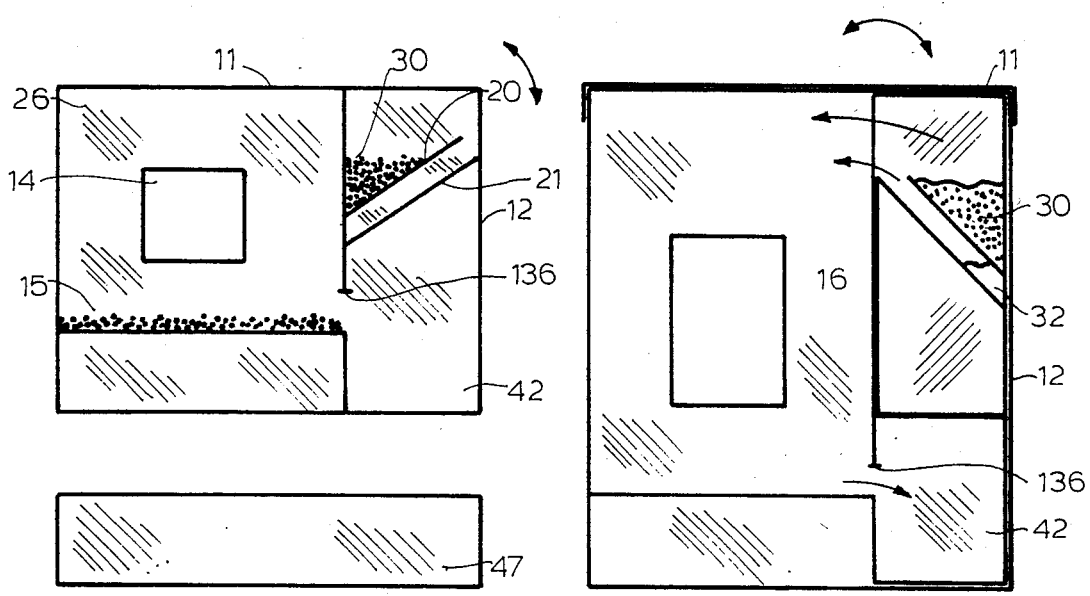
Fig.11
Fig.12
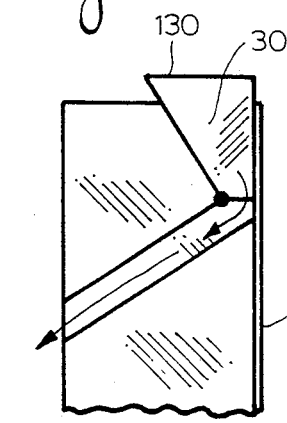
Fig.13
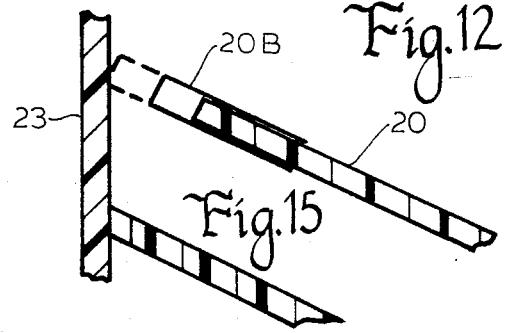
Fig.15
Fig.14

PET LITTER BOX SYSTEM

BACKGROUND OF THE INVENTION

For a number of years, the use of sand or preprepared litter for domestic pets has been recognized as a partial solution to the problem of maintaining a household pet while providing some toilet facilities for the pet. Cats being relatively clean animals and dogs being easily trained, can be provided with a litter tray in which they will perform their natural functions.

The problem of santation, not only for the pet but for the pet owner, has not been fully solved to date. Examples of patents showing different approaches to pet litter boxes are as follows:

| | | |
|---|---|---|
| 4,448,151 | H. E. Lowe | May 15, 1984 |
| 4,348,982 | J. W. Selby | Sep. 4, 1982 |
| 4,327,667 | R. C. Bilak | May 4, 1982 |
| 4,305,544 | W. Noonan | Dec. 15, 1981 |
| 4,164,314 | A. C. Edgar | Aug. 14, 1979 |
| 4,117,804 | Moore et al | Oct. 3, 1978 |
| 4,096,827 | J. A. Cotter | Jun. 27, 1978 |
| 3,831,557 | J. N. Elesh | Aug. 27, 1974 |
| 3,316,880 | Jungles et al | May 2, 1967 |
| Europ. 3,093 | F. Monnet | Publ. 7/25/79 |

Each of the above examples present advances in the art, however, a number of serious needs still remain in a truly practical pet litter box, namely (a) the pet litter box should provide clean litter for the use of the pet, easily without any contact by the pet owner with either the fresh or used litter;

(b) the pet litter box should remove used litter and the pet's soil as well;

(c) the pet litter box should provide a supply of clean litter;

(d) the pet litter box should collect out of sight and out of odor range all used litter;

(e) the pet litter box should allow change of litter in a simple manner;

(f) the pet litter box should provide for a simple means for disposing of the used litter and pet soil;

(g) the pet litter box should be so sanitary that the pet finds it acceptable for repeated use.

(h) the pet litter box should perform the main functions of the box of dispensing and clearing the litter as automatically as possible;

(i) the pet litter box should greatly increase the periods between changes of litter, that is, a minumum of two weeks; and (j) the pet litter box should provide for economy of litter, thus cutting costs. All of the foregoing needs are not met by any one pet litter box known to me including those disclosed in the above patents.

BRIEF DESCRIPTION OF THE INVENTION

Faced with this state of the art, I have set about to invent an improved pet litter box which meets all of these requirements and which may be produced at a minimum cost and usable without any contortions on the part of the pet and the pet owner. Likewise, I sought to design a pet litter box which accomplishes all of the above desired objectives and further totally conceals the used litter and pet soil from view by the pet owner.

I further sought to invent a pet litter box in which the used litter and soil may be transferred to a disposal container and fresh litter replaced by a single simple action on the part of the pet owner.

All of these objectives have been accomplished by me in my improved pet litter box. In one embodiment it comprises an outer box or container with an opening for ingress and egress of the pet. The box has a floor area which is, when in use covered with a layer of pet litter. The box has an inner box located to one side of the floor area which serves the pet's needs. The inner box includes a fresh litter compartment at the upper region and a soiled litter collection region toward the bottom and level with the floor.

The fresh litter compartment is generally triangular in shape with a vertical wall of the inner box and side walls of the inner box defining three of the walls of the fresh litter compartment. An angular inner wall of the inner box defines a hypotenuse wall of the fresh litter compartment. The top of this compartment is either open and sealed by the top of the outer box or may have its own lid. In either case the apex formed at the upper end of the hypotenuse wall is open along the entire length of the apex by reason of the hypotenuse leg being shortened.

A second angular internal wall defines with the hypotenuse wall of the fresh litter compartment, a chute extending the full width of the inner box and communicates with the exterior of the inner box above the floor level.

The apex region at the upper corner of the inner box constitutes a volume for measuring a quantity of fresh litter whenever the boxes are tipped by about 90 degrees around an axis defined by the lower edge of the boxes at the end where the inner box is located.

The second angular internal wall, mentioned above, extends fully to both opposite walls of the inner box and thereby seals the fresh litter delivery chute from the used litter collection region, below.

On the lower side of the second internal angular wall, a full width opening in the side wall of the inner box communicates with a used litter collection chute which generally parallels the fresh litter delivery chute. Contained within the generally triangular space at the bottom of the inner box is a used litter collection container. In the preferred embodiment, this inner box is a right triangular cross section box with a flap opening corresponding in position to the upper end region of the used litter collection chute. In another embodiment of this invention, the collection container is a refuse collection plastic bag which encloses the collection region of the inner box. The plastic bag can enclose the collection area of the inner box since a pair of slots in the side walls of the inner box provide a path for encirclement.

When configured as described above, the top of the outer box may be removed, the fresh litter space filled with litter and the top replaced on the top of the outer box. The outer and inner boxes are tipped together as one object about the lower edge identified above. Fresh litter fills the apex region including part of the delivery chute.

Next, the boxes are tipped back to their normal position. The fresh litter present in the apex region and delivery. chute cascades down in a sheet and across the floor of the outer box.

After use by the pet or an appropriate number of uses, the pet owner repeats the tipping procedure, 90 degrees followed by return to normal. Upon tipping 90 degrees, a charge of fresh litter moves to the apex and the used litter and pet soil slide up the collection chute and fall into the collection container. Upon righting of the boxes, the charge of fresh litter flows down the delivery chute and across the pet floor and the facilities are again ready for use. After the fresh litter is exhausted or after a number of uses by the pet, the cover and inner box are removed and the used litter container and its pet soil may be disposed of by merely closing its flap (or neck of the plastic bag and depositing it in the normal household rubbish container. The pet owner never touches and hardly, if at all, sees the used litter and pet soil.

In another embodiment of this invention, the return chute for disposal of used litter has been eliminated and an end slot opening at the side toward which the box is tipped to provide a fresh charge is used. The collection compartment is located to the side and below the pet floor.

This invention may be used by the simple practice of loading the fresh litter, tipping the boxes once a day and the first time that no cascading fresh litter is heard upon tipping of the boxes, refilling the fresh litter container and removing the used litter container.

BRIEF DESCRIPTION OF THE DRAWING

This invention and its use may be more clearly understood from the following detailed description and by reference to the drawing, in which:

FIG. 1 is a perspective view of this invention;

FIG. 1A is a perspective view of this invention shown in phantom form to illustrate the internal elements and was accomplished by producing this invention from transparent materials;

FIG. 2 is an exploded view of this invention;

FIG. 3 is a vertical sectional view of this invention taken along line 3—3 of FIG. 2;

FIG. 4 is a top plan view of the inner box of this invention;

FIG. 5 is a bottom plan view thereof;

FIG. 6 is a series of sequence diagrams showing the embodiment of FIG. 1A as used by a pet owner:

FIG. 7 is a seris of sequence diagrams showing the emodiment of FIG. 1 in use showning the movement of litter in the invention;

FIG. 8 is a side elevational view of the inner box of this invention employing a plastic bag as the collection container for used refuse and pet soil;

FIG. 9 is a front elevational view of a used litter collection container being carried for disposal; and FIG. 9A is a top plan view of the litter collection container of FIG. 9 when in "knocked down" of original flattened condition as produced;

FIG. 10 is a perspective view of a pair of litter containers of the type shown in FIG. 9, filled with fresh litter and grouped for transport or sale to pet owners.

FIG. 11 is a vertical sectional view through an alternate embodiment of this invention employing fixed partition fresh litter supply, a side pet entry and a slot discharge arrangement for used litter;

FIG. 12 is a vertical sectional view of another alternate embodiment of this invention;

FIG. 13 is a side elevational view of the inner box of this invention, modified for hinged mounting of the fresh litter storage container;

FIG. 14 is a perspective view of a further alternate embodiment of this invention incorporating a vestibule area in the pet litter box as well as a separate detachable lower refuse container; and FIG. 15 is a fragmentary vertical sectional view of a fresh litter flow control arrangement for use in this invention.

DETAILED DESCRIPTION OF THE INVENTION

GENERAL

The pet owner who acquires one of my inventions has, at a location appropriate for his pet's toilet functions, a simple appearing box like structure, generally designated 10 in FIG. 1, having a removable top 11 and an outer box body 12 and a suitably sized opening 13. An optional inner to 13A is shown which may be used to seal the top of the inner box 16 described below.

The opening 13 through which the pet enters the box 12 may be open, or as illustrated in FIG. 1 has a cross slit flexible door 14. The pet enters box 10 by pushing aside the flaps formed by the slits and climbs through into the floor area 15, best seen in FIGS. 1A and 2. The floor area is designed to be large enough for the pet to perform his natural functions without undue restriction. I have found that for a cat weighing up to 15 pounds, a floor, 13 by 18 inches in size is adequate. The overall box 10 then may have the following dimensions of 24" by 18" by 18" high, in a typical embodiment. These dimensions may, of course, be varied to suit the size of the pet.

Referring now to FIGS. 2 and 1A, the internal components of this invention are visible, in part in FIG. 2 and fully in a transparent or phantom version as shown in FIG. 1A. In addition to the outer box 12, my invention includes an inner box 16 which is nearly the same height as the outer box 12, slightly narrower to allow it to fit inside of the outer box 12 in a rather snug fit and approximately one half the length of the outer box 12 to leave floor 15 available for the pet. Inner box 16 covers only the portion of the floor labeled 15A. The inner box 16 may include optional side flaps 16A and 16B, shown in dashed lines in FIG. 2, to fully seal box 16 against the side walls of box 12.

Clearly observable within the inner box 16 are a pair of generally parallel extending angular internal walls 20 and 21. Wall 20 extends from near the top edge 22 and near the rear wall 23 of inner box 16 to a lower point on the front wall 24 of the inner box 16. The wall 20 extends from the near side wall 25 to the far side wall 26 of the inner box 16. With the outer walls of the box 16, internal wall 20 defines a generally triangular bin or fresh litter storage area 30, best seen in FIG. 3 and a metering zone 31 in which a measured amount of fresh litter is gathered in use as described below.

Internal wall 21 extends from the rear wall 23, downward and forward, generally parallel to wall 20 to the front wall 24 of the box 16 which has a front opening 32 in the wall 24 between the walls 20 and 21. Walls 20 and 21 form a fresh litter supply chute 33 and the front opening 32 constitutes a fresh litter discharge opening. The walls 20 and 21 are both secured to the side walls 25 and 26 and the front wall 24 by suitable means such as any suitable plastic cement in the case where the box 16 is formed of plastic material or by flaps 20A or 21A of FIG. 3, if the box 16 is fabricated from corregated cardboard.

The opening 32 extends across the front of the box 16 so that fresh litter may be delivered across the entire floor as a thin sheet of adequate depth for its purpose. Highly absorbant litter such as is sold under the trademark JONNY CAT, has been found to be satisfactory, as well as common sand.

A third internal wall, namely angular wall 34 extends from the bottom of the front wall 24, part way up and to the rear leaving a large opening 35 between the rear end of the wall 34 and the rear wall 23 of the box 16. The wall 34 extends from near side wall 25 to far side wall 26 and defines with the wall 21, a used litter collection chute 36 beginning at a lower opening 40 in the front wall 24 of box 16. The lower opening 40 extends across the entire front wall 24 of box 16 in order to allow the collection of all used litter from floor 15 during the collection process as described below.

Wall 34, appearing in FIG. 3 and present but unshown in the preferred embodiment of FIG. 2, is in fact a double wall having an upper section 34A and a lower section 34B connected at the upper rear ends of those sections at line 36. The side walls 25 and 26 of the box 16 are slotted in the areas between the sections A and B of wall 34. This provides a transverse slot 41 through the box 16 through which a plastic trash collection bag may be slipped to enclose the lower third of the box 16 without obstructing the collection chute 36. This arrangement with a collection bag 50 in place is shown in FIG. 8.

The volume to the rear and below the wall 34 within the nested boxes 12 and 16 is the collection zone for used litter and pet soil. This zone 42 is the place where the used litter is accumulated before removal. As indicated above, where a plastic trash bag 50 is used as illustrated in FIG. 8, the zone 42 is enclosed from below by the bag 50.

In FIG. 2, a rigid disposal container is used. It constitutes a disposable box 60 which generally fills the collection zone 42 and is typified by a right triangular cross section box having a foldable flap 61 forming approximately one half of the hypotenuse side of the triangle with the fold line indicated as 62. The collection box 60 is dimensioned to fit within the box 16 with the flap 61 open as illustrated in FIGS. 2 and 3.

OPERATION

The normal use and operation of this invention is best illustrated by reference to FIG. 6 which shows the transparent embodiment as it is moved through its normal cycles and FIG. 7 for a non-transparent version but shown in section going through the same series of 5 steps, (a) through (e).

(a) Ready to be put into use

In both embodiments, the apparatus is shown fully charged with a load of fresh litter 70 in the fresh litter storage zone 30 in the inner box 16. This has already been accomplished by removal of top 11, filling the zone 30 from a bag or other container of litter and replacing the rather tight fitting top or cover 11. The zone 30 is filled up to the top edge of wall 20 for maximum capacity. The collection box 60 is in position in the collection zone with its flap 61 folded downward and outward beneath wall 34. The chutes 33 and 36 are clear and box 60 is empty.

(b) Metering charge of litter

The pet owner after filling the storage zone 30 with fresh litter and replacing the lid, tips the entire assembly to its side as shown in FIGS. 6(b) and 7(b). The litter 70 flows down into the metering region 31 and partly into the chute 33. Typically, this volume will receive 10% of the full load of fresh litter. The assembly is next returned to its normal position as shown in views (c). These show that most of the fresh litter has returned to its storage zone 30 but the quantity from the charging zone 31 has flowed vigorously down the chute 33, out opening 32 and has spread over the floor 15. When the chute 33 is relatively steep, e.g. 40 to 60 degrees with respect to the horizontal, the flow is rapid and gives a good distribution of the fresh litter across the floor 15.

(d) Removal of used litter and preparing a fresh charge

After the pet has used the litter box once or more than one time, the pet owner repeats the steps (b) and (c) but the action within the boxes 12, 16 and 60 is partly the same but the collection step now takes place in step (d) and further in step (e). In step (d), fresh litter again flows into the charging zone 31 in a measured amount. At the same time, the used litter and pet soil flows through opening 40 and down chute 36 to the collection zone 35 and partly into the open door of the disposal box 60.

There is no attempt to screen or save the used litter as in many litter boxes.

(e) Replacing the fresh litter and collecting used litter

The pet owner, now, merely returns the assembly to its horizontal position as shown in (e). The new fresh charge flows down chute 33 and out opening 32 as in (c) and spreads over floor 15. The used litter and pet soil falls directly and completely into box 60. The litter box is again ready for use. The pet owner has not touched or even seen the used litter and pet soil.

The steps of (b) through (e) may be repeated after pet use or on a regular schedule until the fresh pet litter is exhausted. This can be determined by sound when the pet owner does not hear any fresh litter cascade down and across floor 15 upon returning the assembly to position (a,c,e). He then removes the cover 11, lifts out the box 16, reaches down, closes the flap 61 and grasps the cutout handles 63 and 64 of the box 60 as shown in FIG. 2. He then lifts the box 60 out and disposes it in its entirety with household rubbish. The flap 61, as shown in FIG. 2 (c) includes tabs 65 which fit into slots 66 to hold flap 61 closed. Thus the box 60 when closed is rather secure and there is no need to see, smell or worry about disposal of the litter and pet soil. It may be easily carried for disposal as illustrated in FIG. 9.

In case the pet owner elects to use disposable plastic trash bags instead of the disposal box 60, the removal routine is modified, slightly. When the box 16 is lifted upward, care should be taken to grasp the plastic bag 50 and lift it with box 16 until both clear the outer box 12. Then the box 16 is separated from the plastic bag 50 by lifting while grasping bag 50 firmly. The bag 50 will slide out of slot 41 in box 16. the bag 50 may then be disposed of by twist-tying the neck or other means and depositing the entire bag 50 in the household trash. A new abag 50 is then slipped over the lower third of the box 16, through the slot and the combination returned to their position in box 12. A fresh load of litter is introduced into the storage area 30, the top 11 replaced and the litter box is ready for use.

In each of these embodiments an outer box 12 and an inner box 16 are used to maintain the entire apparatus closed. If a pet is used to using an open tray and does not desire to enter a closed or dark box, the transparent embodiment of FIGS. 1A and 6 may be used. If the pet still prefers the open tray, the cover 11 may be inverted and used without the box 12. In such case a separate tight fitting cover for the box 16 is needed. It is merely a smaller duplicate of cover 11, dimensioned to close the top of box 16. In such case, the box 16 will rest in the inverted cover 11 and the litter box has become a litter tray with full exposure. While clearing and charging this modified combination, care must be taken in tipping and returning the box to avoid spilling either the fresh or used litter. Because of these limitations in the open tray approach, the favored embodiment is as shown in FIGS. 1, 2 and 7.

The use of the disposable box 60 is also preferred in carrying out this invention. One further advantage is achieved by employing the box 60. The ease of carrying illustrated in FIG. 9 is not only applicable to disposal of used litter. Box 60 forms an ideal container for the transport and sale of fresh litter. It can hold one full load for the storage area 30 so it can be purchased full, carried to the litter box, emptied into the storage zone 30 of box 16, and then placed below the box 16 in the collection zone as in FIGS. 3 and 7 and the box 16 put in place, cover 11 replaced and the litter box is ready for use. When the fresh litter is used, its volume plus the pet soil will then be in box 60 and it may be disposed of as described above.

The novel shape of box 60 does not make it impractical for storage and transport as is illustrated in FIG. 10 in which a pair of filled boxes 60 form a "case" of pet litter for transport or sale. The box 60 of FIG. 9 is shown in "knocked down" shape in FIG. 9A with each of the fold lines shown as dashed lines, locking tabs extending outward and handle openings 63 and 64 clearly visible.

It may be seen from FIG. 9A that the box 60 may be easily manufactured and readily assembled to provide a hypotenuse opening, easily closed and readily carried litter transport container.

The foregoing embodiments are preferred but variations within the contemplation of this invention are illustrated in FIGS. 11 through 15 to which reference is now made.

In FIG. 11, the opening 14 is located in a side wall rather than in one end wall. The pet entry can be located in three of the four walls as is illustrated in FIGS. 1 for an end wall and FIG. 11 for a side wall. Also, the second box is built into outer box and not separable. This simplifies construction. The floor 15, in the embodiment of FIG. 11 is located above and to the side of the collection area with communication between the floor 15 and collection area 42 being through a slot 136 which substitutes for the chute 36 of the previous embodiments. Tipping of the box in the direction of the double ended arrow of FIG. 11 allows the used litter and pet waste to slide off of the floor 15 into the collection area 42.

The collection area 42 of the embodiment of FIG. 11 is open at its bottom and communicates with a separable waste box 47 which holds the box 12. The waste box may be plastic lined or hold a removable plastic bag as in the case of the previous embodiments or the collection box 60 of FIG. 2.

The embodiment of FIG. 11 has as a principal advantage its simplicity.

The embodiment of FIG. 12 employs the disposal slot 136 similar to FIG. 11 but does not use the separable waste container 47 of FIG. 11. Instead, this embodiment uses a removable second box 16 as in the earlier embodiments and that box 16 is removed to clear used waste from collection area 42 by inverting the entire box 12 with the box 16 removed or the collection box 60 of the type shown in FIG. 9 removed. Note also, that the box 16 is reversible so that the automatic feed through slot is used in more than one position. In the other, i. e. reversed, it tilts forward for manual measure of fresh litter.

In both FIGS. 11 and 12, collection box 60 of FIG. 9 is preferred in area 42. The removable bottom is one means, only, for access to the disposable box. A side opening to the outer box may be used.

With this arrangement, the hopper area 30 may be used for storage of fresh litter and the fresh litter is cast by hand from the storage area 30 by hand or scoop with the top removed. Replacement of used litter and waste is accomplished in this embodiment prior to replacement with fresh litter in the same manner as in previous embodiments by tipping and returning the box following the double ended arrow unless in the automatic mode.

A variation of the embodiment of FIG. 12 appears in FIG. 13. In this case, the fresh litter storage area 30 is within a hinged hopper 130 in box 160. When inserted in place of box 16 of FIG. 12, in the same direction as in FIG. 13, the hopper 130 may be tipped to dispense the exact amount of fresh litter as the user may desire to place on the floor for the pet's use. The tipping hopper 130 substitutes for hand dipping of fresh litter as in FIG. 12. Using the embodiment of FIG. 12, tipping of the hopper 130 provides manual charging of fresh litter and tilting of the entire assembly provides automatic feed. In FIG. 12, the removable box 16 is intended in his embodiment to provide two functions:

1. Automatic measurement as described in the previous examples with the baffles facing rearward; and
2. Manual measure where the baffles face forward toward floor 15.

Some form of stopper such as a plug (unshown in the drawing) or the baffle extension 20B of FIG. 12 prevents litter from entering the fresh litter discharge chute 33. Manual measure is accomplished by tilting the box forward rather than rearward. Litter then pours over the lip and onto floor 15. The amount of litter discharged is determined by the angle of tilt and the length of time that the pet owner allows the litter to flow. Scooping out previse amounts is possible instead of tilting the assembly.

I have also developed an arrangement in which the pet owner may control the amount of litter dispensed automatically, using any of the embodiments of this invention without the need scoop or dispense by tipping a hopper as just described. This feature is illustrated in FIG. 15. In this case, the shelf 20 includes an adjustable extension 20B, which slips over the upper edge of the shelf 20 and varies the size of the opening OP from a medium opening as shown in the drawing to a maximum size with the extension 20A slipped down fully overlapping the shelf 20. The extension 20A allows the fresh litter supply to be closed off by extending it into full contact with the wall 23 as indicated by the dashed lines. Employing this feature, the pet owner may, with slight experimentation, determine the correct opening of extension 20A to provide just the right amount of litter with a single tipping of the litter box.

FIG. 14 illustrates a further refinement of this invention in which the box 12 includes a vestibule area 112 which is preferably carpeted. The pet enters the box 12 through opening 14 and then opening 14A to the floor area 15. The use of the vestibule with carpeting insures that the pet will not carry litter from the box 12 to the rest of the house. The carpeting is sufficient to remove any litter clinging to the pet's paws. The openings 14 and 14A are preferably offset to insure the pet placing all feet on the carpeting on exiting the box 12.

The foregoing constitute the best mode which I know of for carrying out this invention and is illustrative of the principle of this invention. The best mode and alternate modes described above are not to be considered as limiting. Instead, my invention is to be measured by the following claims including the protection afforded to me by the doctrine of equivalents.

I claim:

1. A pet litter container comprising:
    a first box defining a floor region for holding pet litter in an area for use by a pet;
    a second box for delivery of fresh litter to said floor and for the collection of used litter and pet soil;
    said second box containing a fresh litter storage area above the level of said floor;
    said second box including means defining a delivery path extending from said fresh litter storage area to said floor;
    said second box including means defining a collection path for the passage from said floor of used litter and pet soil into a holding region;
    said paths positioned so that upon tipping said second and first boxes together, fresh litter flows from said fresh storage litter area into a portion of said delivery path and used litter and pet soil flows into said collection path;
    whereupon returning said first and second boxes to their original position, the supply of fresh litter is delivered to said floor and the used litter and pet soil is delivered to the said litter collection area and the litter box is ready for reuse.

2. A pet litter container in accordance with claim 1 wherein said collection path includes an internal opening at the level of said floor whereby used litter and pet soil may flow off an edge of said floor for disposal.

3. A pet litter container in accordance with claim 1 wherein said second box defines a generally triangular cross section fresh litter storage area with an opening communicating with said delivery path at one upper apex of said triangle.

4. A pet litter container in accordance with claim 1 in which the walls defining the used litter and pet soil collection area of said second box define said collection area as generally triangular in shape with an opening communicating between said collection path and said collection area at an upper apex of said triangle.

5. A pet litter container in accordance with claim 1 in which said second box is positionable to one side of said floor with openings of said delivery and collection paths directed toward said floor;
    said first box substantially enclosing said second box whereby said first and second box may be tipped together to accomplish collection of the used litter and pet soil and for the delivery of fresh litter to the said floor.

6. A pet litter container in accordance with claim 1 wherein said first box is reversible within said second box whereby delivery of fresh litter may be by tipping of said boxes in the opposite direction to accomplish delivery of fresh litter.

7. The pet litter container in accordance with claim 1 wherein said paths include respective generally parallel chutes in said second box.

8. A pet litter container in accordance with claim 7 wherein said chutes are defined by three generally parallel internal walls in said second box presenting generally horizontally extending openings in the region of said floor.

9. A pet litter container in accordance with claim 8 in which said openings extend substantially the width of said floor whereby one of said openings collects used litter and pet soil from across the entire floor width and said second opening discharges fresh litter in a sheet-like pattern across the said floor.

10. A pet litter container in accordance with claim 9 in which said walls defining said chutes are angularly positioned with respect to the horizontal and downward toward said floor area.

11. A pet litter container in accordance with claim 10 in which two walls defining the delivery chute for fresh litter are positioned with the opening communicating with the floor, above said floor.

12. A pet litter container in accordance with claim 10 in which the walls defining said chute for the collection of used litter and pet soil include one wall defining one edge of said opening at the level of said floor whereby used litter and pet soil freely flow into said collection chute upon tipping of said first and second boxes toward said second box.

13. A pet litter container in accordance with claim 1 wherein said used litter and pet soil collection area constitutes a bottom portion of said second box which is adapted to receive a disposable collection container.

14. A pet litter container in accordance with claim 13 wherein said second box includes slot means in at least two walls thereof for receiving a flexible bag surrounding said collection area except for the opening therein at said collection chute.

15. A pet litter container in accordance with claim 13 wherein said disposable container comprises a third box dimensioned to fit within said collection area and including an opening therein communicating with the opening to said collection area from said collection path.

16. A pet litter container dispensing and collection system comprising:
    an enclosure including a pet access opening to allow a pet to enter to carry out natural body functions;
    said enclosure including a floor region of sufficient size to allow a pet to perform those functions;
    a hopper region above the level of said floor for the storage of fresh litter;
    a collection region in the region of said floor;
    said enclosure defining a pair of paths for the flow of pet litter by gravity from said one hopper to said floor and the second of said pair of paths from said floor to said collection region;
    said paths including an intermediate region to which a measured amount of fresh litter and all used litter and pet soil flows upon tipping of the enclosure in one direction;
    said paths positioned to deliver the measured amount of fresh litter to said floor region and said used litter and pet soil to said collection area upon the returning of said enclosure to its original position.

17. A pet litter container in combination with claim 16 wherein said paths are defined by a plurality of internal generally parallel walls defining a pair of generally parallel chutes.

18. A pet litter container in combination with claim 16 wherein said collection region is located in a removable container having an opening communicating with said second path.

19. The combination in accordance with claim 16 wherein said collection region is defined by an opened top box upon which said enclosure may rest.

20. A pet litter container in combination with claim 16 wherein said hopper region is defined by a pivotally mounted container within said enclosure in which fresh litter is introduced into said one path by pivoting of said container.

21. A pet litter container in combination with claim 17 wherein the amount of fresh litter introducable into said one path is controllable by means of a movable extension of one of said walls which serves to increase or decrease the cross sectional of said one path.

22. A pet litter box comprising:
an enclosure including a pet access opening in one wall thereof;
said enclosure defining a litter floor region for the pet to perform it's bodily functions;
said ecnlosure defining a vestibule region between said pet access opening and said floor;
said vestibule region having a carper-like floor whereby the pet must pass through said vestibule for access to and from said litter floor region;
said pet litter box including a source of fresh litter within said enclosure above said floor and a used litter and pet soil region adjacent to said floor;
means communicating said source of fresh litter with said litter floor and means for removing the used litter from said floor;
both of said last means operative responsive to tipping of said enclosure to one side and returning it to its normal position.

* * * * *

UNITED STATES PATENT AND TRADEMARK OFFICE
CERTIFICATE OF CORRECTION

PATENT NO.  : 4,667,622
DATED       : May 26, 1987
INVENTOR(S) : David S. Breault It is certified that error appears in the above-identified patent and that said Letters Patent is hereby corrected as shown below:

column 3, line 41, after "a", cancel "seris", and insert ---series---.

column 3, line 42, after "use", cancel "showning", and insert ---showing---.

column 6, line 58, after "new", cancel "abag", and insert ---bag---.

column 8, line 46, after "out", cancel "previse", and insert ---precise---.

column 12, line 6, after "said", cancel "ecnlosure", and insert ---enclosure---.

column 12, line 8, after "a", cancel "carper-like", and insert ---carpet-like---.

Signed and Sealed this

Third Day of November, 1987

Attest:

DONALD J. QUIGG

Attesting Officer

Commissioner of Patents and Trademarks